United States Patent
Gudwer

(10) Patent No.: US 11,602,138 B2
(45) Date of Patent: Mar. 14, 2023

(54) APPARATUS AND METHOD FOR QUICKLY CHANGING THE SURFACE FEATURES OF A FISHING FLASHER

(71) Applicant: Moonshine Lures, LLC, Perkins, MI (US)

(72) Inventor: Thomas J. Gudwer, Rapid River, MI (US)

(73) Assignee: Moonshine Lures, LLC, Perkins, MI (US)

( * ) Notice: Subject to any disclaimer, the term of this patent is extended or adjusted under 35 U.S.C. 154(b) by 93 days.

(21) Appl. No.: 17/381,971

(22) Filed: Jul. 21, 2021

(65) Prior Publication Data

US 2022/0030843 A1 Feb. 3, 2022

Related U.S. Application Data

(60) Provisional application No. 63/057,332, filed on Jul. 28, 2020.

(51) Int. Cl.
*A01K 85/01* (2006.01)

(52) U.S. Cl.
CPC .................................. *A01K 85/011* (2022.02)

(58) Field of Classification Search
CPC ...... A01K 85/011; A01K 85/14; A01K 85/01; A01K 85/012; A01K 99/00
USPC .... 43/17.5, 42.09, 42.17, 42.32, 42.33, 42.5
See application file for complete search history.

(56) References Cited

U.S. PATENT DOCUMENTS

| | | | | |
|---|---|---|---|---|
| 2,213,701 A * | 9/1940 | Haselwood | ............ | A01K 85/14 43/42.33 |
| 3,656,253 A * | 4/1972 | Gaunt | .................. | A01K 91/065 43/42.34 |
| 3,673,727 A * | 7/1972 | Bauer | ..................... | A01K 85/14 43/42.5 |
| 4,201,006 A * | 5/1980 | Wetherald | .............. | A01K 85/00 43/42.51 |
| 5,970,648 A * | 10/1999 | DeRose | ................. | A01K 91/06 43/42.22 |
| 6,085,404 A * | 7/2000 | Thomas | ................. | A01K 85/14 43/42.39 |
| 6,279,260 B1 * | 8/2001 | Farr | ....................... | A01K 91/06 43/43.12 |
| 6,493,984 B1 * | 12/2002 | Bechhold | ............... | A01K 91/08 43/42.46 |
| D516,663 S | 3/2006 | Pool et al. | | |
| 8,806,802 B2 * | 8/2014 | Jones | ..................... | A01K 85/12 43/17.1 |
| D810,229 S | 2/2018 | Pool | | |

(Continued)

*Primary Examiner* — Timothy D Collins
*Assistant Examiner* — Maria E Graber
(74) *Attorney, Agent, or Firm* — Edwin A. Sisson, Attorney at Law, LLC; Jeffrey J. Banyas

(57) ABSTRACT

Described herein is a fishing flasher. The fishing flasher may comprise a main body portion which may comprise a passage. A fin may extend from a surface of the main body portion proximate to the trailing end of the main body portion. The fishing flasher may also comprise a removable panel which is sized and shaped to fit within the passage and may be held within the passage by at least one fastener. It is also described herein a fishing flasher kit comprising a main body portion comprising a passage, a fin, and a plurality of removable panels. Each removable panel may have a different surface feature on one or both of the first surface and/or the second surface.

18 Claims, 6 Drawing Sheets

(56) References Cited

U.S. PATENT DOCUMENTS

| | | | | |
|---|---|---|---|---|
| D873,374 S | * | 1/2020 | Gibson | D22/129 |
| 11,116,196 B2 | * | 9/2021 | Gibson | A01K 85/10 |
| 2005/0252069 A1 | * | 11/2005 | Pool | A01K 91/065 |
| | | | | 43/17.1 |
| 2013/0276349 A1 | * | 10/2013 | Tigner | A01K 85/01 |
| | | | | 43/42.19 |
| 2015/0366178 A1 | * | 12/2015 | Bechhold | A01K 91/065 |
| | | | | 43/17.6 |
| 2017/0295766 A1 | * | 10/2017 | Talbot | A01K 85/18 |
| 2018/0288989 A1 | * | 10/2018 | Cooper | A01K 97/05 |

\* cited by examiner

APPARATUS AND METHOD FOR QUICKLY CHANGING THE SURFACE FEATURES OF A FISHING FLASHER

CROSS REFERENCES AND PRIORITIES

This Application claims priority from U.S. Provisional Application No. 63/057,332 filed on 28 Jul. 2020 the teachings of which are incorporated by reference herein in their entirety.

BACKGROUND

Fishermen often utilize fishing attractors, and in particular flashers to attract fish, such as salmon, to a lure. Flashers are also sometimes referred to as rotators. Such lures may include artificial lures, live bait, or other materials associated with a fishhook which cause a fish to strike and become hooked.

Flashers are conventionally attached to a fishing line between the fisherman's rod and the lure. The flasher causes lateral movement of the bait as the flasher and bait are drawn through the water. Often the flasher will have a reflective or "shiny" surface feature to visually attract a fish.

Different colors and patterns of the reflective surface feature may be desirable for different fishing conditions and circumstances. Typically, this requires the fisherman to stock an extensive inventory of flashers having different surface features such as painted on colors, reflective materials, and/or luminous paint. When conditions or circumstances change, the fisherman must remove one flasher from the fishing line and replace it with a different flasher having different surface features. This process is often time consuming. Additionally, this requires significant expense for the fisherman to stock a wide variety of different flashers for different fishing conditions and circumstances.

The need exists, therefore, for an apparatus and method for quickly changing the surface features of a fishing flasher and reducing the expense of inventory of fishing flashers needed by the fisherman.

SUMMARY

It is disclosed a fishing flasher comprising a main body portion, a removable panel, and a fin. The main body portion may extend in a body plane along a body longitudinal axis from a body leading end to a body trailing end opposite the body leading end. The main body portion may comprise a body first surface and a body second surface opposite the body first surface. The main body portion may also comprise at least one passage extending from the body first surface through the body plane and the body second surface. The main body portion may further comprise a first attachment hole located proximate to the body leading end, and a second attachment hole located proximate to the body trailing end. The fin may extend from the body second surface proximate to the body trailing end.

The removable panel may extend in a panel plane along a panel longitudinal axis from a panel leading end to a panel trailing end opposite the panel leading end. The removable panel may also comprise a panel first surface and a panel second surface opposite the panel first surface.

The removable panel may be sized and shaped to fit within the passage. In some embodiments, the body longitudinal axis may be substantially aligned with the panel longitudinal axis. The removable panel may be held within the passage by at least one fastener. At least a portion of the panel first surface may comprise a first surface feature. At least a portion of the panel second surface may comprise a second surface feature.

In some embodiments, the main body portion may further comprise a leading end turn. The leading end turn may be along a leading end turn axis. The leading end turn axis may form a leading end turn angle relative to the body longitudinal axis. The leading end turn angle may be in a range of between 90° and 120°. The leading end turn may proceed in a first direction away from the longitudinal axis at a first turn angle. The first turn angle may be in a range of between 5° and 45°.

In certain embodiments, the main body portion may further comprise a trailing end turn. The trailing end turn may be along a trailing end turn axis. The trailing end turn axis may form a trailing end turn angle relative to the body longitudinal axis. The trailing end turn angle may be in a range of between 90° and 120°. The trailing end turn may proceed in a second direction away from the longitudinal axis at a second turn angle. The second turn angle may be in a range of between 5° and 45°. In some embodiments, the first direction of the leading end turn may be opposite the second direction of the trailing end turn.

In some embodiments, the passage may comprise a passage lip. The passage lip may extend along at least a portion of a passage perimeter. In some such embodiments, the removable panel may comprise a panel lip. The panel lip may extend along at least a portion of the panel perimeter corresponding to the portion of the passage perimeter which comprises the passage lip.

In certain embodiments, the at least one fastener may comprise a first tab. The first tab may be pivotably connected to the main body portion by a first screw. In some embodiments, the at least one fastener may comprise a second tab. The second tab may be pivotably connected to the main body portion by a second screw.

In some embodiments, the fin may form a third angle relative to the body longitudinal axis. The third angle may be in a range of between 30° and 150°. In certain embodiments, the fin may further comprise a recess.

In certain embodiments, the first surface feature and/or the second surface feature may comprise a color. In some such embodiments, the color—when used—may be painted onto the body first surface and/or the body second surface. In some embodiments the first surface feature and/or the second surface feature may comprise a reflective surface feature. In certain embodiments, the first surface feature and/or the second surface feature may comprise a luminous surface feature.

It is also disclosed a fishing flasher kit comprising a main body portion, at least one fastener, a fin, at least one fastener, and a plurality of removable panels. In the fishing flasher kit the main body portion may extend in a body plane along a body longitudinal axis from a body leading end to a body trailing end opposite the body leading end. The main body portion may comprise a body first surface and a body second surface opposite the body first surface. The main body portion may also comprise at least one passage extending from the body first surface through the body plane and the body second surface. The main body portion may further comprise at first attachment hole located proximate to the body leading end, and a second attachment hole located proximate to the body trailing end. The fin may extend from the body second surface proximate to the body trailing end.

In the fishing flasher kit, each removable panel may extend in a panel plane along a panel longitudinal axis from a panel leading end to a panel trailing end opposite the panel leading end. Each removable panel may also comprise a panel first surface and a panel second surface opposite the panel first surface.

In the fishing flasher kit, each removable panel of the plurality of removable panels may be sized and shaped to fit within the passage with the body longitudinal axis substantially aligned with the panel longitudinal axis. Each removable panel of the plurality of removable panels may be capable of being held within the passage by the at least one fastener.

In the fishing flasher kit, at least a portion of the panel first surface of each removable panel of the plurality of removable panels may comprise a first surface feature. At least a portion of the panel second surface of each removable panel of the plurality of removable panels may comprise a second surface feature.

In some embodiments of the fishing flasher kit, the main body portion may further comprise a leading end turn. The leading end turn may be along a leading end turn axis. The leading end turn axis may form a leading end turn angle relative to the body longitudinal axis. The leading end turn angle may be in a range of between 90° and 120°. The leading end turn may proceed in a first direction away from the longitudinal axis at a first turn angle. The first turn angle may be in a range of between 5° and 45°.

In certain embodiments of the fishing flasher kit, the main body portion may further comprise a trailing end turn. The trailing end turn may be along a trailing end turn axis. The trailing turn axis may form a trailing end turn angle relative to the body longitudinal axis. The trailing end turn angle may be in a range of between 90° and 120°. The trailing end turn may proceed in a second direction away from the longitudinal axis at a second turn angle. The second turn angle may be in a range of between 5° and 45°. In some embodiments, the first direction of the leading end turn may be opposite the second direction of the trailing end turn.

In some embodiments of the fishing flasher kit, the passage may comprise a passage lip. The passage lip may extend along at least a portion of a passage perimeter. In some such embodiments, the removable panel may comprise a panel lip. The panel lip may extend along at least a portion of the panel perimeter corresponding to the portion of the passage perimeter which comprises the passage lip.

In certain embodiments of the fishing flasher kit, the at least one fastener may comprise a first tab. The first tab may be pivotably connected to the main body portion by a first screw. In some embodiments, the at least one fastener may comprise a second tab. The second tab may be pivotably connected to the main body portion by a second screw.

In some embodiments of the fishing flasher kit, the fin may form a third angle relative to the body longitudinal axis. The third angle may be in a range of between 30° and 150°. In certain embodiments, the fin may further comprise a recess.

In certain embodiments of the fishing flasher kit, the first surface feature and/or the second surface feature of at least one removable panel of the plurality of removable panels may comprise a color. In some such embodiments, the color—when used—may be painted onto the body first surface and/or the body second surface. In some embodiments the first surface feature and/or the second surface feature of at least one removable panel of the plurality of removable panels may comprise a reflective surface feature. In certain embodiments, the first surface feature and/or the second surface feature of at least one removable panel of the plurality of removable panels may comprise a luminous surface feature.

DETAILED DESCRIPTION

Disclosed herein is a fishing flasher and a fishing flasher kit. The fishing flasher and fishing flasher kit are described below with reference to the Figures. As described herein and in the claims, the following numbers refer to the following structures as noted in the Figures.

10 refers to a fishing flasher.
100 refers to a main body portion.
105 refers to a body longitudinal axis.
110 refers to a body leading end.
120 refers to a body trailing end.
130 refers to a body first surface.
140 refers to a body second surface.
150 refers to a passage.
155 refers to a passage lip.
160 refers to a first attachment hole.
170 refers to a second attachment hole.
180 refers to a leading end turn.
181 refers to a leading end turn axis.
182 refers to a leading end turn angle.
183 refers to a first turn angle.
190 refers to a trailing end turn.
191 refers to a trailing end turn axis.
192 refers to a trailing end turn angle.
193 refers to a second turn angle.
200 refers to a removable panel.
205 refers to a panel longitudinal axis.
210 refers to a panel leading end.
220 refers to a panel trailing end.
230 refers to a panel first surface.
240 refers to a panel second surface.
250 refers to a panel lip.
300 refers to a fin.
400 refers to a fastener.
410 refers to a first tab.
415 refers to a first screw.
420 refers to a second tab.
425 refers to a second screw.

Figure 1:
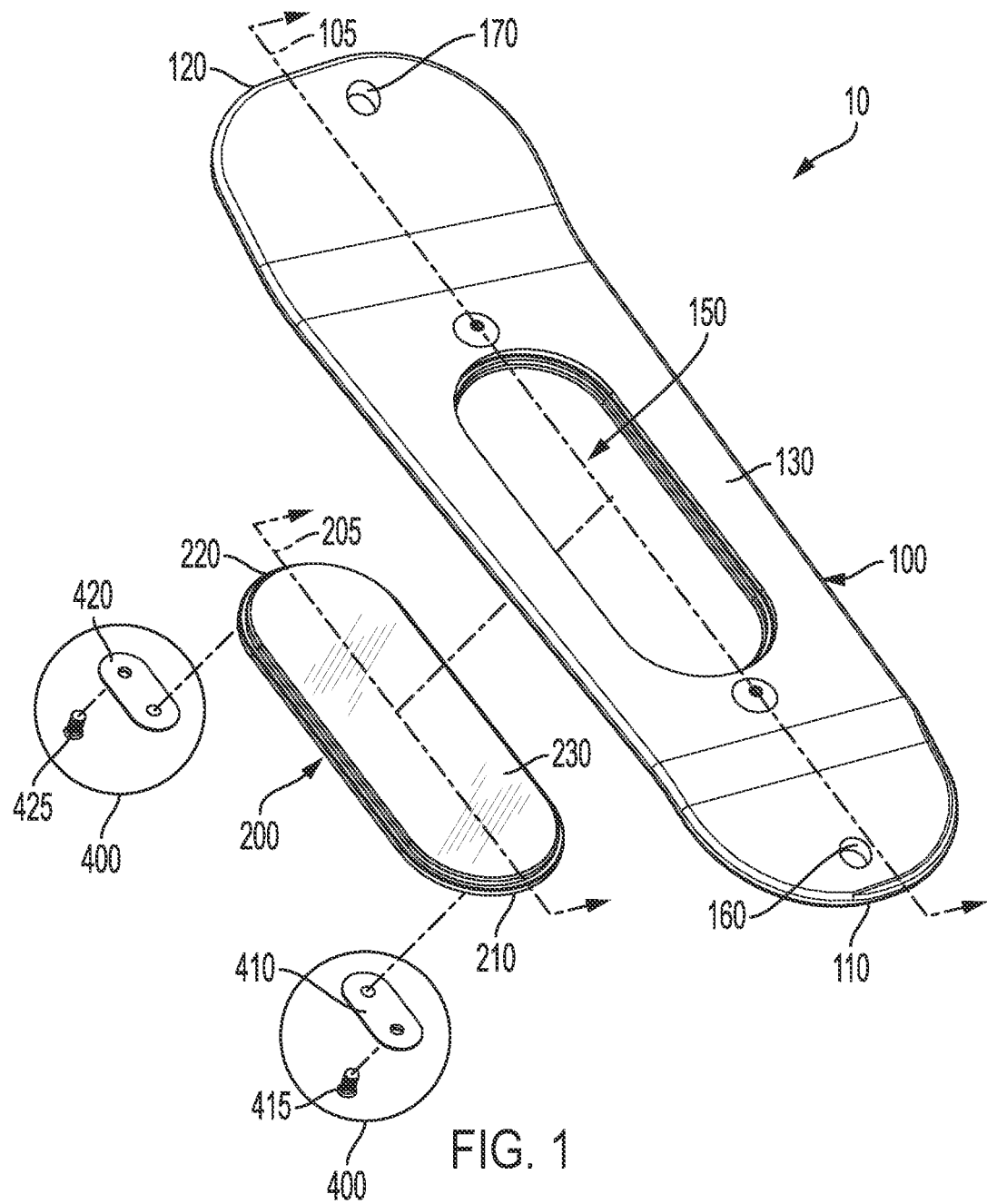
FIG. 1 is an exploded perspective view of an embodiment of a fishing flasher.

FIG. 1 shows an exploded perspective view of one embodiment of a fishing flasher (10). As used herein and in the claims, the term fishing flasher is synonymous with and also includes a fishing rotator. As shown in FIG. 1, the fishing flasher may comprise a main body portion (100), a removable panel (200)—which may also be referred to as an insert or an insert panel, a fin (300 shown in FIG. 3A), and at least one fastener (400 with FIG. 1 showing two separate fasteners).

The main body portion (100) will extend in a body plane along a body longitudinal axis (105) from a body leading end (110) to a body trailing end (120) opposite the body leading end. As shown in the Figures, the body plane refers to the section of main body portion which does not encompass the optional leading end turn (180) (when present) and the optional trailing end turn (190) (when present). The body leading end and body trailing end refer to the ends of the main body portion as they are configured when attached to a fishing pole with the body trailing end attached to the fishing pole by a fishing line at a further distance from the tip of the fishing pole than that of the body leading end.

Figure 3A:
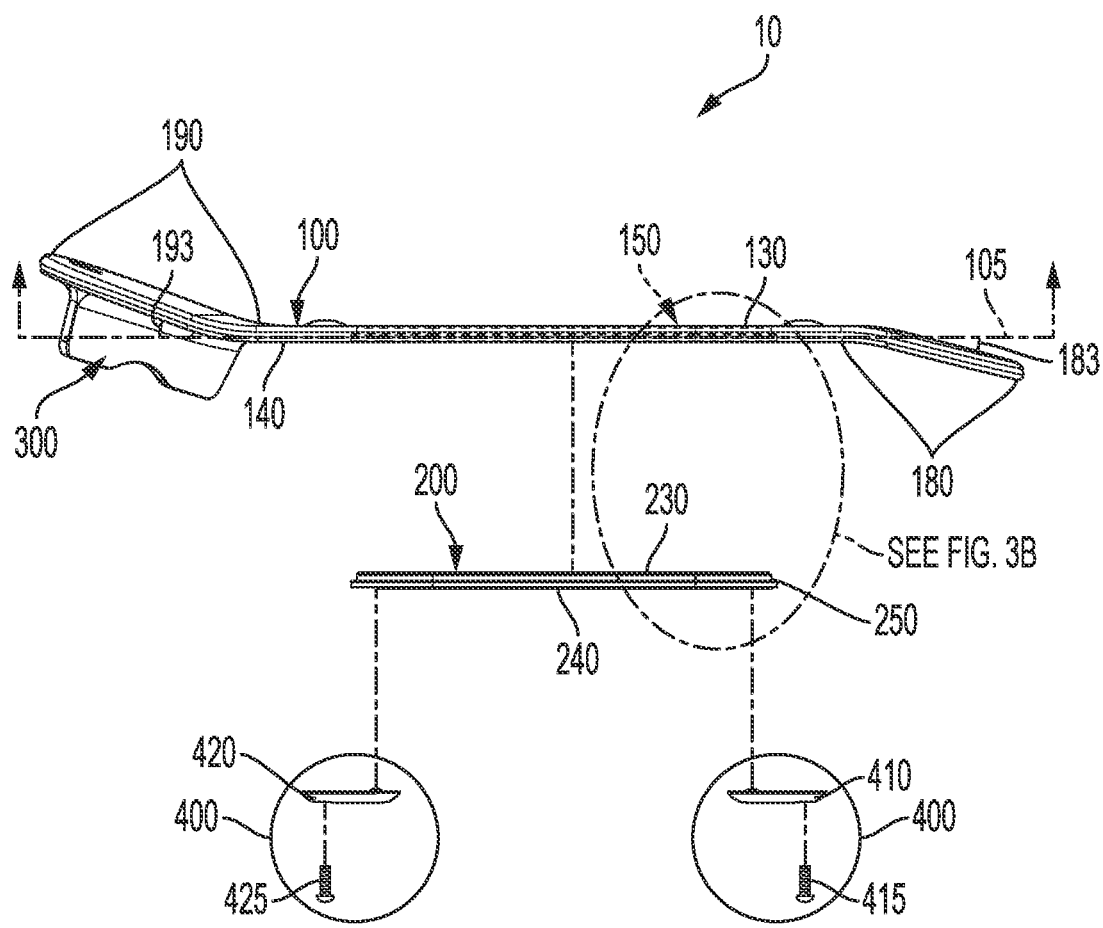
FIG. 3A is an exploded side view of an embodiment of a fishing flasher.

As shown in FIG. 1, the main body portion (100) will comprise a body first surface (130) and a body second surface (140 as shown in FIG. 3A) opposite the body first surface. The main body portion will also comprise at least one passage (150) extending from the body first surface through the body plane and the body second surface.

The passage (150) may come in many shapes and sizes. One preferred shape is an ovular shape as shown in the Figures, however, other shapes may exist, non-limiting examples of which include a circular shape, a rectangular shape, a square shape, a hexagonal shape, or an octagonal shape. The shape and size of the passage is not considered important; however, it is preferred that the passage be of similar or identical shape to that of the removable panel (200) with the removable panel having a slightly smaller size to allow the removable panel to fit within the passage. In some embodiments, there may be a plurality of passages of varying shapes and sizes with each passage configured to the size and shape of a separate removable panel as described herein.

The main body portion (100) may further comprise a first attachment hole (160) located proximate to the body leading end (110). Similarly, the main body portion may comprise a second attachment hole (170) located proximate to the body trailing end (120). The first attachment hole and/or the second attachment hole allow the fishing flasher to be connected to a fishing pole (not shown) via a fishing line (not shown).

The main body portion (100) may be fabricated of any number of materials including rigid plastics, metals, woods, and rigid composite materials. Rigid plastics are a preferred material for fabricating the main body portion. Nonlimiting examples of such rigid plastics include polyesters such as the polyethylenes (e.g. high-density polyethylene (HDPE)), the polypropylenes, polyethylene terephthalate (PET), the polyamides such as nylon 6 and nylon 66, and polyvinyl chloride (PVC). The main body portion may be formed according to any number of known manufacturing techniques with injection molding being a preferred manufacturing technique.

FIG. 1 also shows certain details of the removable panel (200). As shown in FIG. 1, the removable panel will extend in a panel plane along a panel longitudinal axis (205) from a panel leading end (210) to a panel trailing end (220) opposite the panel leading end. The panel leading end and panel trailing end refer to the ends of the panel as they are configured when the fishing flasher is attached to a fishing pole with the panel trailing end being at a further distance from the tip of the fishing pole than that of the panel leading end. The removable panel will also comprise a panel first surface (230) and a second surface (240 as shown in FIG. 3A) opposite the panel first surface.

The removable panel (200) may come in many shapes and sizes. One preferred shape is an ovular shape as shown in the Figures, however, other shapes may exist, non-limiting examples of which include a circular shape, a rectangular shape, a square shape, a hexagonal shape, or an octagonal shape. The shape and size of the removable panel is not considered important; however, it is preferred that the removable panel be of a similar or identical shape to that of the passage (150) with the removable panel having a slightly smaller size to allow the removable panel to fit within the passage. In some embodiments, there may be a plurality of removable panels of varying shapes and sizes with each removable panel configured to the size and shape of a separate passage as described herein.

The removable panel (200) may be fabricated of any number of materials including rigid plastics, metals, woods, and rigid composite materials. Rigid plastics are a preferred material for fabricating the removable panel. Nonlimiting examples of such rigid plastics include polyesters such as the polyethylenes (e.g. high-density polyethylene (HDPE)), the polypropylenes, polyethylene terephthalate (PET), the polyamides such as nylon 6 and nylon 66, and polyvinyl chloride (PVC). The removable panel may be formed according to any number of known manufacturing techniques with injection molding being a preferred manufacturing technique.

At least a portion of one or both of the panel first surface (230) and/or the panel second surface (240) may comprise one or more surface features. Examples of surface features include colors, reflective surface features, and luminous surface features. Color refers to the reflection of specific wavelengths of light within the visible spectrum of between 380 nm and 700 nm, and the intensity of such reflection. For example, reflected light having wavelengths in the range of 625 nm to 740 nm is generally observed by the human eye as red while reflected light having wavelengths in the range of 450 nm to 495 nm is generally observed by the human eye as blue. Colors may be applied to the panel first surface and/or the panel second surface by painting a surface of the panel, or by manufacturing the panel of a colored material.

A reflective surface feature is a surface feature that reflects light in the visible spectrum of between 380 nm and 700 nm by reflecting the light off of tiny spherical glass beads made from optical-grade glass and coated on the side which adheres to the panel surface with aluminum. Reflective surface features may be applied to the panel first surface and/or the panel second surface using a variety of techniques including painting a reflective surface finish onto the panel surface, applying an adhesive decal—such as a vinyl decal—onto the panel surface, or manufacturing the panel of a naturally reflective material.

Luminous surfaces may be in the form of phosphorescent surfaces or chemiluminescent surfaces. Phosphorescent refers to a surface which, when exposed to shorter wavelength radiation (light), absorbs a portion of the light and reemits said light at a longer wavelength. Chemiluminescent refers to a surface that emits light as the result of a chemical reaction. Luminous surface features may be applied to the panel first surface and/or the panel second surface by painting a surface of the panel with a luminous paint, or by manufacturing the panel of a naturally luminous material.

In some embodiments, the entirety of one or both of the panel first surface (230) and/or the panel second surface (240) may comprise a surface feature. In some embodiments, the panel first surface will comprise a surface feature having a similar or identical color, reflective pattern, and/or luminescence as the surface feature of the panel second surface. In other embodiments, the panel first surface will comprise a surface feature having a different color, reflective pattern, and/or luminescence as the surface feature of the panel second surface.

Figure 6:
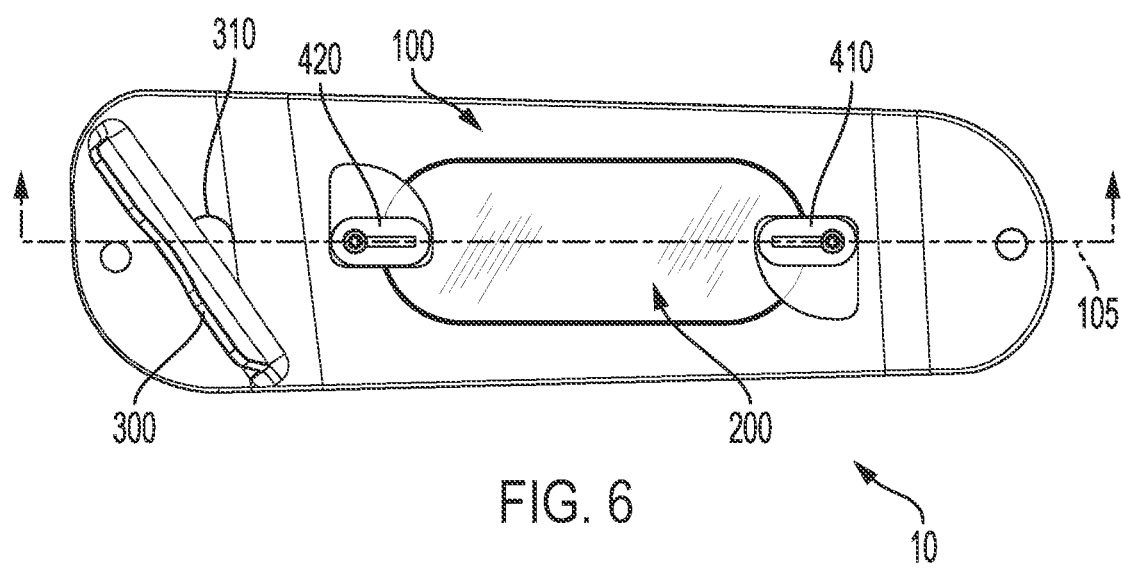
FIG. 6 is a bottom view of an embodiment of a fishing flasher.

FIG. 1 also shows at least one fastener (400). The fasteners may come in a variety of configurations. In the configuration shown in FIG. 1, the fasteners comprise a pair of tabs known as the first tab (410)—which may also be referred to as a first washer tab—and the second tab (420)—which may also be referred to as a first washer tab. These tabs may be pivotably connected to the main body portion by a pair of screws known as the first screw (415—corresponding to the first tab) and the second screw (425—corresponding to the second tab). Preferably the first tab and the second tab will be pivotably connected to the body second surface (140 as shown in FIG. 6), however, embodiments may exist in which one or both of the first tab and/or the second tab will be pivotably connected to the body first surface.

While the Figures show two fasteners in the form of tabs connected to the main body portion via screws, embodiments may exist having different numbers and configurations of fasteners. For example, in some embodiments, one or more of the fasteners may include a bolt, a rivet, a clip, a hook and loop fastener system such as Velcro®, and/or a clamp. In some embodiments there may be at least one fastener, at least two fasteners, at least three fasteners, or at least four fasteners. In some embodiments, the fastener(s) may be replaced with, or supplemented by, an adhesive such as a tape and/or a glue.

Figure 2:
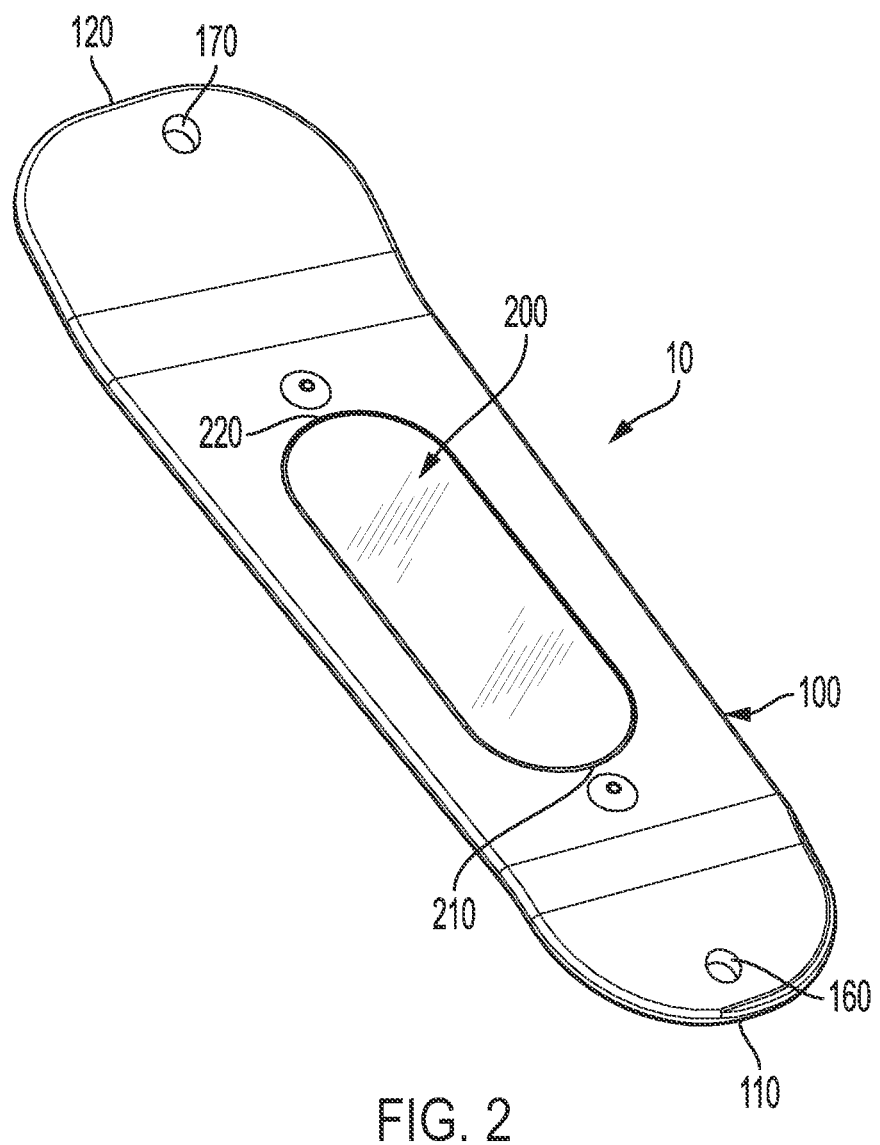
FIG. 2 is an assembled perspective view of the embodiment of a fishing flasher of FIG. 1.

FIG. 2 shows an assembled perspective view of the embodiment of a fishing flasher (10) as shown in FIG. 1. As shown in FIG. 2, the removable panel (200) may be held within the passage (150 as shown in FIG. 1)—at least in part—by the at least one fastener (400 as shown in FIG. 1). The removable panel is of a size and shape to fit within the passage (150) of the main body portion with the body longitudinal axis (105 as shown in FIG. 1) substantially aligned with or aligned with the panel longitudinal axis (205 as shown in FIG. 1). While the embodiments shown in the Figures include the body longitudinal axis substantially aligned with the panel longitudinal axis, other embodiments may exist in which the body longitudinal axis and the panel longitudinal axis form an angle when the removable panel is within the passage. In such embodiments, the angle formed between the body longitudinal axis and the panel longitudinal axis may be in a range selected from the group consisting of between 1° and 30°, between 1° and 20°, between 1° and 10°, between 1° and 5°, between 5° and 30°, between 5° and 20°, between 5° and 10°, between 10° and 30°, between 10° and 20°, and between 20° and 30°.

The at least one fastener (400) is used to assist in securing the removable panel (200) to the main body portion (100). In the embodiments shown in the Figures, the at least one fastener comprises a first tab (410) pivotably connected to the main body portion at a first location along the perimeter of the passage (150) on the body second surface (140) by a first screw (415), and a second tab (420) pivotably connected to the main body portion at a second location along the perimeter of the passage on the body second surface by a second screw (425). Once the removable panel is disposed into the passage, each of the first tab and the second tab pivot around the axis of the respective first screw and second screw to a position in which the tabs contact a portion of the panel second surface to securely connect the removable panel to the main body portion. When removing the removable panel from the main body portion, one simply pivots the first tab and the second tab around the axis of the respective first screw and second screw to a position in which the tabs no longer contact any portion of the panel second surface, thereby allowing the user to extract the removable panel from the passage.

FIG. 3A shows an exploded side view of one embodiment of a fishing flasher (10). Included in FIG. 3A is a main body portion (100), a removable panel (200), a fin (300) extending from a body second surface (140) of the main body portion proximate to a body trailing end (120 as shown in FIG. 1), and at least one fastener (400). The fin is preferably manufactured as an integral piece of the main body portion but may be manufactured as a separate component and later attached to the body second surface such as by an adhesive, by a fastener, or by welding.

Figure 5:
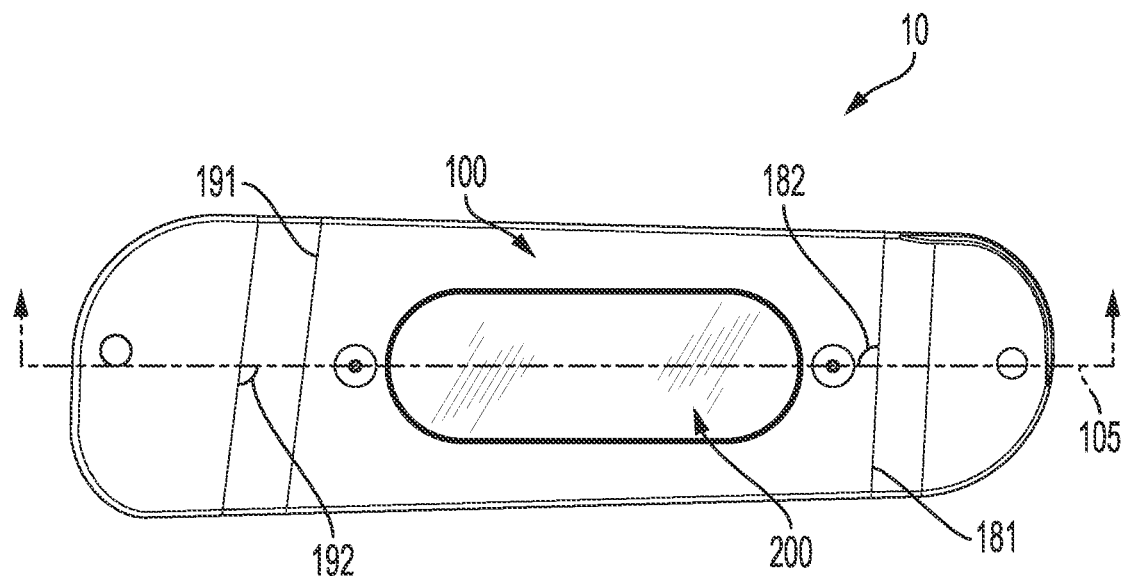
FIG. 5 is a top view of an embodiment of a fishing flasher.

In certain embodiments the main body portion (100) may comprise a leading end turn (180) as shown in FIG. 3A. The leading end turn will be along a leading end turn axis (181 as shown in FIG. 5 and described herein). The leading end turn will proceed in a first direction away from the longitudinal axis at a first turn angle (183) relative to the longitudinal axis as shown in FIG. 3A. The first turn angle may be in a range selected from the group consisting of between 45° and −45°, between 45° and −30°, between 45° and −15°, between 30° and −45°, between 30° and −30°, between 30° and −15°, between 15° and −45°, between 15° and −30°, and between 15° and −15°.

In some embodiments, the main body portion (100) may comprise a trailing end turn (190) as shown in FIG. 3A. The trailing end turn will be along a trailing end turn axis (191 as shown in FIG. 5 and described herein). The trailing end turn will proceed in a second direction away from the longitudinal axis at a second turn angle (193) relative to the longitudinal axis as shown in FIG. 3A. The second turn angle may be in a range selected from the group consisting of between 45° and −45°, between 45° and −30°, between 45° and −15°, between 30° and −45°, between 30° and −30°, between 30° and −15°, between 15° and −45°, between 15° and −30°, and between 15° and −15°.

The leading end turn (180) and trailing end turn (190) are not considered mutually exclusive. That is to say that in some embodiments there may be a leading end turn but no trailing end turn. In other embodiments there may be a trailing end turn but no leading end turn. In still other embodiments there may be both a leading end turn and a trailing end turn. In certain embodiments there may be no leading end turn or trailing end turn. In embodiments where there is both a leading end turn and a trailing end turn it is preferred that the second direction of the trailing end turn be opposite the first direction of the leading end turn.

FIG. 3A further shows the fin (300) extending from the body second surface (140) proximate to the body trailing end (110 as shown in FIG. 1). The fin may extend from the body second surface substantially perpendicular to or perpendicular to the body second surface.

Figure 3B:
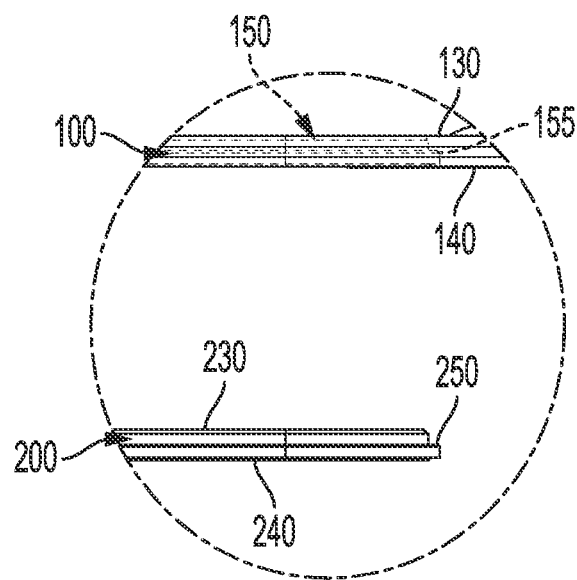
FIG. 3B is a close-up exploded side view of a passage and a removable panel for an embodiment of a fishing flasher.

FIG. 3B shows the exploded side view of the embodiment of a fishing flasher of FIG. 3A focusing on the removable panel (200) and the section of the main body portion (100) comprising the passage (150). As shown in FIG. 3B, in some embodiments, the passage (150) may comprise a passage lip (155). When present, the passage lip may extend along at least a portion of the passage perimeter, while in certain embodiments the passage lip may extend along the entirety of the passage perimeter. FIG. 3B also shows the removable panel which may comprise a panel lip (250). When present, the panel lip may extend along at least a portion of the panel perimeter. Preferably, the portion of the panel perimeter along which the panel lip extends will correspond to the portion of the passage perimeter which comprises the passage lip. When assembled, the passage lip and the panel lip interact as shown in FIG. 4B to prevent or reduce the likelihood that the removable panel will dislodge from or fall out of the passage while the fishing flasher is in use.

Figure 4A:
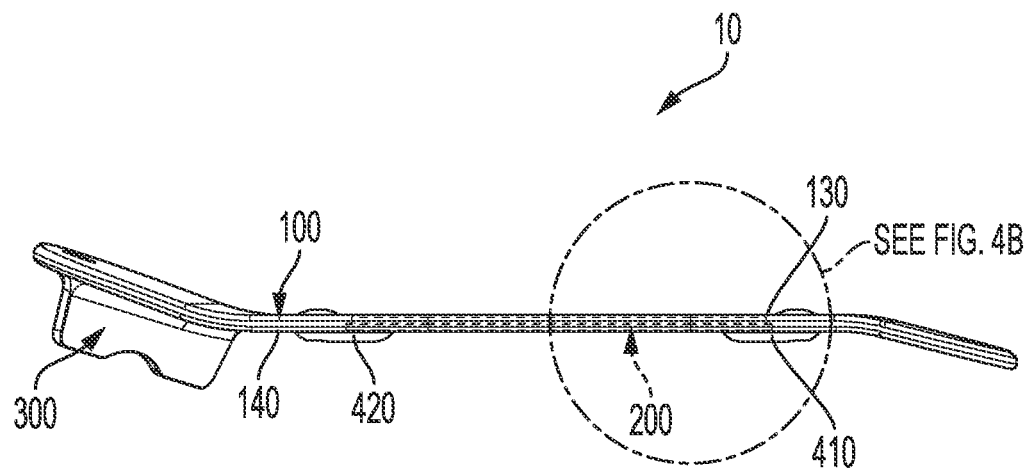
FIG. 4A is an assembled side view of the embodiment of a fishing flasher of FIG. 3.
Figure 4B:
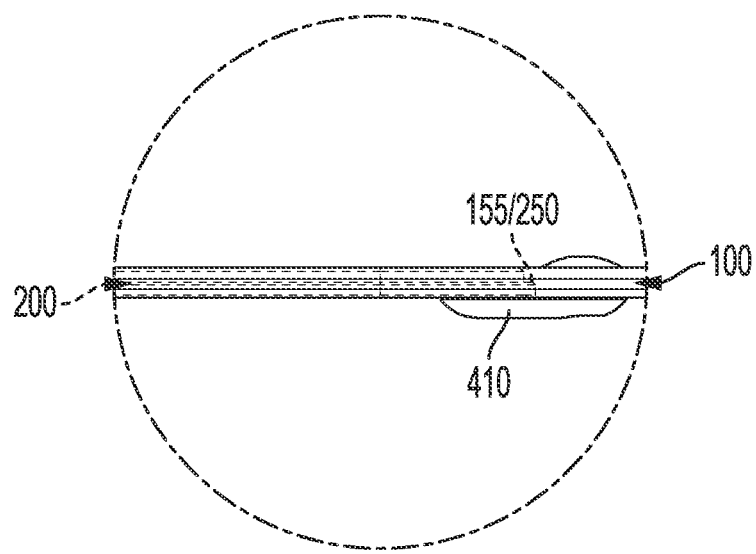
FIG. 4B is a close-up assembled side view of a removable panel installed in a passage for an embodiment of a fishing flasher.

FIG. 4A and FIG. 4B shows an assembled side view of the embodiment of a fishing flasher (10) as shown in FIG. 3A with FIG. 4B focusing on the removable panel (200) and the section of the main body portion (100) comprising the passage (150). In the embodiment shown in FIG. 4A and FIG. 4B, the passage comprises a passage lip (155 as shown in FIG. 3B) while the removable panel comprises a panel lip (250 as shown in FIG. 3B). As shown in FIG. 4A and FIG. 4B, once assembled, the passage lip abuts against the panel lip to prevent or reduce the likelihood that the removable panel will dislodge from or fall out of the passage in the direction of the body first surface (130). In the embodiment shown in FIG. 4A and FIG. 4B, the removable panel is prevented from dislodging from or falling out of the passage in the direction of the body second surface (140) by the fasteners which in this case are in the form of a pair of tabs (a first tab (410) and a second tab (420) pivotably connected to the body second surface by a pair of screws (a first screw (415 as shown in FIG. 3A) and a second screw (425 as shown in FIG. 3A)).

One alternative—not shown—to the panel lip (250) and passage lip (155) configuration may involve tapering at least a portion of the edge of the passage (155) in the direction of the body first surface (130), and tapering a corresponding portion of the edge of the removable panel (200) in the direction of the panel first surface (230). These tapered surfaces may abut against one another to prevent or reduce the likelihood that the removable panel will dislodge from or fall out of the passage in the direction of the body first surface while the fastener(s) prevent or reduce the likelihood that the removable panel will dislodge from or fall out of the passage in the direction of the body second surface (140).

While FIG. 3A through FIG. 4B shows the panel lip (250) and passage lip (155) configured to prevent the panel from dislodging or falling out of the passage in the direction of the body first surface (130) with the fastener(s) (400) configured to prevent the panel from dislodging or falling out of the passage in the direction of the body second surface (140), one of ordinary skill may easily reverse the configuration. That is to say that, in some embodiments, the panel lip and passage lip may be configured to prevent the panel from dislodging or falling out of the passage in the direction of the body second surface with the fastener(s) configured to prevent the panel from dislodging or falling out of the passage in the direction of the body first surface.

FIG. 5 shows a top view of one embodiment of a fishing flasher (10) in assembled form. Included in FIG. 5 is a main body portion (100), and a removable panel (200). FIG. 5 also shows the leading end turn axis (181) of the leading end turn (180). As shown in FIG. 5, the leading end turn axis will form a leading end turn angle (182) relative to the body longitudinal axis (105). The leading end turn angle may be in a range selected from the group consisting of between 90° and 120°, between 90° and 110°, between 90° and 100°, between 100° and 120°, between 100° and 110°, and between 110° and 120°.

Similarly, FIG. 5 further shows the trailing end turn axis (191) of the trailing end turn (190). As shown in FIG. 5, the trailing end turn axis will form a trailing end turn angle (192) relative to the body longitudinal axis (105). The trailing end turn angle may be in a range selected from the group consisting of between 90° and 120°, between 90° and 110°, between 90° and 100°, between 100° and 120°, between 100° and 110°, and between 110° and 120°.

FIG. 6 shows a bottom view of one embodiment of a fishing flasher (10) in assembled form. As shown in FIG. 6, the fin (300) may form a third angle (310) relative to the body longitudinal axis (105). The third angle may be in a range selected from the group consisting of between 30° and 150°, between 30° and 120°, between 30° and 90°, between 30° and 60°, between 60° and 150°, between 60° and 120°, between 60° and 90°, between 90° and 150°, between 90° and 120°, and between 120° and 150°.

Figure 7:
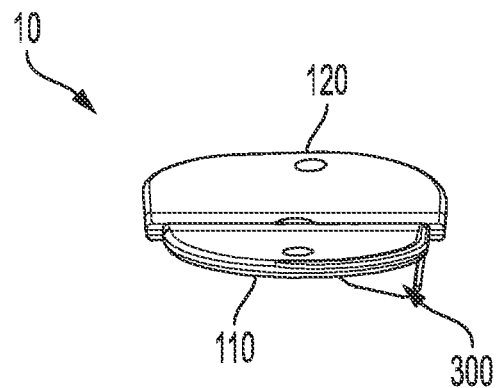
FIG. 7 is a front view of an embodiment of a fishing flasher.

FIG. 7 shows a front view of one embodiment of a fishing flasher (10) in assembled form. FIG. 7 illustrates the first direction of the leading end turn (180 as shown in FIG. 3) proceeding in the opposite direction of the second direction of the trailing end turn (190 as shown in FIG. 3).

Figure 8:
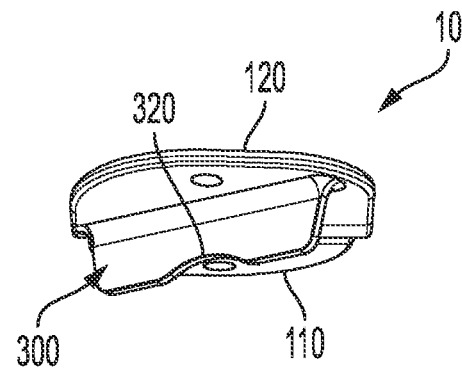
FIG. 8 is a rear view of an embodiment of a fishing flasher.

FIG. 8 shows a rear view of one embodiment of a fishing flasher (10) in assembled form. As shown in FIG. 8, in some embodiments, the fin (300) may further comprise at least one recess (320). While the recess shown in FIG. 8 has an arced shape, many different shaped recesses may be possible including a triangular shape, a square shape, a zig-zag shape, and a waved shape.

In certain embodiments, the fishing flasher (10) may come in the form of a fishing flasher kit. As used herein and in the claims, the term fishing flasher kit is synonymous with and also includes a fishing rotator kit. The fishing flasher kit may comprise at least one main body portion (100) of any configuration and having any of the features disclosed herein. In some embodiments, the fishing flasher kit may comprise a plurality of main body portions. The fishing flasher kit may also comprise a fin (300) of any configuration and having any of the features disclosed herein. The fishing flasher kit may further comprise at least one fastener (400) of any configuration and having any of the features disclosed herein.

The fishing flasher kit may also comprise a plurality of removable panels (200). Each removable panel of the plurality of removable panels may be of any configuration and have any of the features disclosed herein. The number of removable panels in the kit is not considered important for purposes of the kit and may be selected from the group consisting of at least 2 removable panels, at least 5 removable panels, at least 10 removable panels, and at least 20 removable panels. Preferably, each removable panel in the fishing flasher kit will comprise a panel first surface feature having a color, reflective pattern, and/or luminescence; and/or a panel second surface feature having a different color, reflective pattern, and/or luminescence which is different from that of at least one other panel of the plurality of removable panels.

The removable panel allows a fisherman to quickly and easily change the surface features of the fishing flasher as fishing conditions and circumstances change. The fisherman may do so by simply disengaging the fastener(s), extracting the removable panel from the passage, replacing the removable panel with a different removable panel having a different surface features on one or both of the first surface and/or the second surface, and reengaging the fastener(s) with the different removable panel. Unlike prior art fishing flashers, changing the surface features of the fishing flasher described herein does not require the fisherman to remove the fishing flasher from the fishing line. By only including one fishing flasher and a plurality of removable panels, the fisherman also reduces the expenses related to keeping a wide inventory of flashers having different surface features.

What is claimed is:

1. A fishing flasher (10) comprising:
a main body portion (100) extending in a body plane along a body longitudinal axis (105) from a body leading end (110) to a body trailing end (120) opposite the body leading end, said main body portion comprising a body first surface (130), a body second surface (140) opposite the body first surface, at least one passage (150) extending from the body first surface through the body plane and the body second surface, a first attachment hole (160) located proximate to the body leading end, and a second attachment hole (170) located proximate to the body trailing end; a removable panel (200) extending in a panel plane along a panel longitudinal axis (205) from a panel leading end (210) to a panel trailing end (220) opposite the panel leading end, said removable panel comprising a panel first surface (230), and a panel second surface (240) opposite the panel first surface; and
a fin (300) extending from the body second surface proximate to the body trailing end; and
wherein the removable panel is sized and shaped to fit within the passage;
wherein the removable panel is held within the passage by at least one fastener (400);
wherein at least a portion of the panel first surface comprises a first surface feature and/or at least a portion of the panel second surface comprise a second surface feature; and
wherein the at least one fastener comprises a first tab (410) pivotably connected to the main body portion by a first screw (415), and a second tab (420) pivotably connected to the main body portion by a second screw (425).

2. The fishing flasher of claim 1, wherein the fin further comprises a recess (320).

3. The fishing flasher of claim 1, wherein the first surface feature and/or the second surface feature comprises a color.

4. The fishing flasher of claim 1, wherein the first surface feature and/or the second surface feature comprises a reflective surface feature.

5. The fishing flasher of claim 1, wherein the first surface feature and/or the second surface feature comprises a luminous surface feature.

6. The fishing flasher of claim 1, wherein the passage comprises a passage lip (155) extending along at least a portion of a passage perimeter, and the removable panel comprises a panel lip (250) extending along at least a portion of a panel perimeter corresponding to the portion of the passage perimeter which comprises the passage lip.

7. The fishing flasher of claim 1, wherein the main body portion further comprises a leading end turn (180) along a leading end turn axis (181) with a line of intersection between the leading end turn axis and the body longitudinal axis forming a leading end turn angle (182) in a range between 90° and 120° wherein said leading end turn proceeds in a first direction away from the longitudinal axis at a first turn angle (183) in a range between −45° and 45°.

8. The fishing flasher of claim 7, wherein the main body portion further comprises a trailing end turn (190) along a trailing end turn axis (191) with a line of intersection between the trailing end turn axis and the body longitudinal axis forming a trailing end turn angle (192) in a range between 90° and 120° wherein said trailing end turn proceeds in a second direction away from the longitudinal axis at a second turn angle (193) in a range between −45° and 45°.

9. The fishing flasher of claim 8, wherein the first direction is opposite the second direction.

10. A fishing flasher kit comprising:
a main body portion (100) extending in a body plane along a body longitudinal axis (105) from a body leading end (110) to a body trailing end (120) opposite the body leading end, said main body portion comprising a body first surface (130), a body second surface (140) opposite the body first surface, at least one passage (150) extending from the body first surface through the body plane and the body second surface, a first attachment hole (160) located proximate to the body leading end, and a second attachment hole (170) located proximate to the body trailing end; a fin (300) extending from the body second surface proximate to the body trailing end;
at least one fastener (400); and
a plurality of removable panels (200) with each removable panel extending in a panel plane along a panel longitudinal axis (205) from a panel leading end (210) to a panel trailing end (220) opposite the panel leading end, and each removable panel comprises a panel first surface (230), and a panel second surface (240) opposite the panel first surface; and
wherein each removable panel of the plurality of removable panels is sized and shaped to fit within the passage;
wherein each removable panel of the plurality of removable panels is capable of being held within the passage by the at least one fastener;
wherein at least a portion of the panel first surface of each removable panel of the plurality of removable panels comprises a first surface feature and/or at least a portion of the panel second surface of each removable panel of the plurality of removable panels comprises a second surface feature; and
wherein the at least one fastener comprises a first tab (410) pivotably connected to the main body portion by a first screw (415), and a second tab (420) pivotably connected to the main body portion by a second screw (425).

11. The fishing flasher kit of claim 10, wherein the fin further comprises a recess (320).

12. The fishing flasher kit of claim 10, wherein the first surface feature and/or the second surface feature of at least one removable panel of the plurality of removable panels comprises a color.

13. The fishing flasher kit of claim 10, wherein the first surface feature and/or the second surface feature of at least one removable panel of the plurality of removable panels comprises a reflective surface feature.

14. The fishing flasher kit of claim 10, wherein the first surface feature and/or the second surface feature of at least one removable panel of the plurality of removable panels comprises a luminous surface feature.

15. The fishing flasher kit of claim 10, wherein the passage comprises a passage lip (155) extending along at least a portion of a passage perimeter, and each removable panel of the plurality of removable panels comprises a panel lip (250) extending along at least a portion of a panel perimeter corresponding to the portion of the passage perimeter which comprises the passage lip.

16. The fishing flasher kit of claim 10, wherein the main body portion further comprises a leading end turn (180) along a leading end turn axis (181) with a line of intersection between the leading end turn axis and the body longitudinal axis forming a leading end turn angle (182) in a range between 90° and 120° wherein said leading end turn proceeds in a first direction away from the longitudinal axis at a first turn angle (183) in a range between −45° and 45°.

17. The fishing flasher kit of claim 16, wherein the main body portion further comprises a trailing end turn (190) along a trailing end turn axis (191) with a line of intersection between the trailing end turn axis and the body longitudinal axis forming a trailing end turn angle (192) in a range between 90° and 120° wherein said trailing end turn proceeds in a second direction away from the longitudinal axis at a second turn angle (193) in a range between −45° and 45°.

18. The fishing flasher kit of claim 17, wherein the first turn direction is opposite the second turn direction.

* * * * *